United States Patent
Ben-Moshe et al.

(10) Patent No.: US 10,746,880 B2
(45) Date of Patent: Aug. 18, 2020

(54) NAVIGATION SYSTEM INTERFERENCE LOCATOR

(71) Applicant: Ariel Scientific Innovations Ltd., Ariel (IL)

(72) Inventors: Boaz Ben-Moshe, Herzliya (IL); Roy Yozevitch, Nofim (IL)

(73) Assignee: Ariel Scientific Innovations Ltd., Ariel (IL)

( * ) Notice: Subject to any disclaimer, the term of this patent is extended or adjusted under 35 U.S.C. 154(b) by 76 days.

(21) Appl. No.: 16/132,428

(22) Filed: Sep. 16, 2018

(65) Prior Publication Data

US 2019/0033463 A1 Jan. 31, 2019

Related U.S. Application Data

(63) Continuation of application No. 15/043,634, filed on Feb. 15, 2016, now Pat. No. 10,082,580.
(Continued)

(30) Foreign Application Priority Data

May 31, 2015 (IL) .......................... 239103

(51) Int. Cl.
*G01S 19/21* (2010.01)
*H04K 3/00* (2006.01)

(52) U.S. Cl.
CPC ............ *G01S 19/21* (2013.01); *G01S 19/215* (2013.01); *H04K 3/90* (2013.01)

(58) Field of Classification Search
CPC .......... G01S 19/21; G01S 19/215; H04K 3/90
See application file for complete search history.

(56) References Cited

U.S. PATENT DOCUMENTS 6,639,541 B1   10/2003   Quintana et al.
6,882,936 B2   4/2005    Desjardin
(Continued)

OTHER PUBLICATIONS

Office Action dated Mar. 4, 2019 From the Israel Patent Office Re. Application No. 239103 and Its Translation Into English. (4 Pages).
(Continued)

*Primary Examiner* — Michael J Zanelli

(57) ABSTRACT

According to some embodiments of the present invention there is provided a method for detecting locations of navigation interfering devices. The method comprises an action of receiving multiple navigation signal parameter datasets, each from one of multiple satellite signal receivers. The method comprises an action of detecting one or more interference event data according to an interference analysis of at least some of the datasets. The method comprises an action of updating a probability value for each of multiple suspected navigation interference device locations, by a location analysis of the interference event data, where each of the probability values is indicative of a likelihood that the interference event data originates from some of the suspected navigation interference device locations. The method comprises an action of selecting a subset of the suspected navigation interference device locations according to the probability values and outputting the subset.

20 Claims, 7 Drawing Sheets
(5 of 7 Drawing Sheet(s) Filed in Color)

Related U.S. Application Data

(60) Provisional application No. 62/168,833, filed on May 31, 2015.

(56) References Cited

U.S. PATENT DOCUMENTS

| | | | |
|---|---|---|---|
| 8,989,235 B2* | 3/2015 | Abdelmonem | ... H04W 28/0236 375/148 |
| 2015/0116145 A1 | 4/2015 | Ashjaee | |
| 2015/0226858 A1 | 8/2015 | Leibner et al. | |
| 2015/0369922 A1 | 12/2015 | Schleppe et al. | |
| 2016/0301434 A1* | 10/2016 | Botchway | ............ H04W 52/24 |
| 2016/0349373 A1 | 12/2016 | Ben Moshe et al. | |

OTHER PUBLICATIONS

Notice of Allowance dated May 21, 2018 From the US Patent and Trademark Office Re. U.S. Appl. No. 15/043,634. (9 Pages).

Irish et al. "Using Crowdsourced Satellite SNR Measurements for 3D Mapping and Real-Time GNSS Positioning Improvement", Proceedings of the 6th Annual Workshop on Wireless of the Students, by the Students, for the Students, S3'14, ACM, Maui, Hawaii, USA, Sep. 7, 2014, p. 5-8, 2014.

Scott "J911: Fast Jammer Detection and Location Using Cell-Phone Crowd-Sourcings", GPS World Staff, 21(11): 1-15, Nov. 1, 2010.

Yozevitch et al. "Tackling the GNSS Jamming Problem Using a Particle Filter Algorithm", Proceedings of the 2014 IEEE 28th Convention of Electrical & Electronics Engineers in Israel, (IEEEI 2014), Eilat, Israel, Dec. 3-5, 2014, p. 663-667, 2014.

* cited by examiner

NAVIGATION SYSTEM INTERFERENCE LOCATOR

RELATED APPLICATIONS

This application is a continuation of U.S. patent application Ser. No. 15/043,634 filed on Feb. 15, 2016, which claims the benefit of priority under 35 USC 119(e) of U.S. Provisional Patent Application No. 62/168,833 filed on May 31, 2015 and Israel Patent Application No. 239103 filed on May 31, 2015.

The contents of the above applications are all incorporated by reference as if fully set forth herein in their entirety

FIELD AND BACKGROUND OF THE INVENTION

The present invention, in some embodiments thereof, relates to navigation systems and, more specifically, but not exclusively, to locating devices interfering with navigation satellite signals.

A Satellite Navigation System (SNS) receiver determines its position by extracting its distance to navigation satellites. The satellite navigation system may have coverage for worldwide (global), regional, national, and the like, geographic areas. For example, the NAVSTAR Global Positioning System (GPS), the Russian GLObal NAvigation Satellite System (GLONASS), the European Union's Galileo positioning system, and the like, are Global Navigation Satellite System (GNSSs). For example, China's BeiDou Navigation Satellite System is a regional SNS.

Given the satellite's location and given the exact distance from each satellite to the SNS receiver, the SNS receiver's location may be computed using triangulation functions. Since those distances are computed by Time-Of-Arrival (TOA) methods, inherent errors are inevitable, such as satellite signal delays caused by the atmosphere, and the like. Contemporary commercial SNS receivers may reach an error between 2 to 5 meters in open sky locations, and in dense urban regions, the error may be as high as 50 meters or more.

Most commercial navigation applications handle such errors, while military and security SNS dependent systems need higher location accuracy. For some systems, knowing the location error is important, such as in risk awareness, evaluation of SNS dependent systems, such as marine or air traffic control systems, and the like. Estimating the SNS receiver's location error may be used for improving the SNS receiver's location accuracy.

Modern commercial SNS receivers are accurate in standard open regions, therefore uncertainty in the reported location may be caused by malfunction, such as a broken antenna, external interference, and/or the like. External SNS signal interference may be accidental interference, such as electromagnetic radiation noise, lack of satellite visibility due to obstructions, and/or the like, or deliberate interference, such as SNS Jamming, Spoofing, and/or the like. Estimating the location error may be relevant in both internal and external interferences.

SNS jammers are devices that generate electromagnetic radiation noise in the carrier frequency of the SNS, such as 1.57 GHz for the L1 global positioning system (GPS), and the like. A SNS jammer transmits electromagnetic radiation noise received by the SNS receiver, thereby degrading the Signal to Noise Ratio (SNR), such as when the SNS receiver is unable to report its location, referred to as loosing SNS fix. Jamming behavior is characterized by a sharp degradation of the satellites signal SNR values. Different SNS jammers produce different ranges from several meters to several kilometers.

While jamming mainly causes signal noise at the SNS receiver, a more sophisticated jamming method exists for deliberate interference of SNS signals, known as spoofing. SNS spoofers are transmitters that emit signals identical to those sent by the SNS satellites to attempt to mislead the SNS receiver. During a spoofing attack, the SNS receiver loses its satellite lock on the genuine satellites.

SNS jamming interference is a major concern both in civilian and military industries. SNS jamming affects not only SNS receivers, but also SNS dependent systems, such as air traffic control systems, and the like.

SUMMARY OF THE INVENTION

According to some embodiments of the present invention there is provided a method for detecting locations of navigation interfering devices. The method comprises an action of receiving multiple navigation signal parameter datasets, each from one of multiple satellite signal receivers. The method comprises an action of detecting one or more interference event data according to an interference analysis of at least some of the navigation signal parameter datasets. The method comprises an action of updating a probability value for each of multiple suspected navigation interference device locations, by a location analysis of the interference event data, where each of the probability values is indicative of a likelihood that the interference event data originates from some of the suspected navigation interference device locations. The method comprises an action of selecting a subset of the suspected navigation interference device locations according to the probability values and outputting the subset.

Optionally, the location analysis comprises a particle filter method iteratively applied to the suspected navigation interference device locations, where each of the suspected navigation interference device locations is a particle and where in each iteration some of the probability values are updated.

Optionally, each of the navigation signal parameter datasets is received by one of the satellite signal receivers from one of multiple navigation signal transmitters.

Optionally, of the navigation signal transmitters is incorporated in a navigational satellite.

Optionally, each of the navigational signal transmitters belongs to a global navigation satellite system, a global positioning system, a regional navigation satellite system, and/or a local navigation system.

Optionally, the navigation signal parameter datasets are received by respective satellite signal receivers at different times.

Optionally, the navigation signal parameter datasets are received by respective satellite signal receivers at different locations.

Optionally, each of the interference event data corresponds to one of the satellite signal receivers.

Optionally, each interference event data comprises an event tag, an event weight, an event location, and an event time.

Optionally, the suspected navigation interference device locations comprise a location coordinates, a device transmission power value, a device velocity value, and a device transmission orientation value.

Optionally, the selecting is performed by matching of the probability values to a threshold value and/or a distribution of values.

Optionally, the interference analysis is performed by calculating two or more signal to noise ratio (SNR) values from some of the navigation signal parameter datasets associated with one of the satellite signal receivers.

Optionally, the location analysis is performed by calculating two or more suspected distances from some of respective the satellite signal receivers according to the SNR values, where each of the suspected distances defines an annular region of probability values around respective one of the satellite signal receivers.

Optionally, the annular regions are combined to generate a probability map of a geographical region.

Optionally, the subset is selected by calculating one or more peaks of the probability map.

Optionally, the device velocity value is calculated by analysis of a temporal change in the probability values.

Optionally, the interference analysis compares a value of a respective navigation signal parameter datasets with a known value.

Optionally, the compared value is a navigational signal transmitter time of day and the known value is a satellite signal receiver time of day.

Optionally, the event weight is calculated from a reduction and/or an increase in a signal to noise ratio (SNR) value derived from some of the navigation signal parameter datasets.

Optionally, some of the navigation signal parameter datasets are from one of the satellite signal receivers.

Optionally, the device transmission power is calculated from two or more SNR values each derived from some of the navigation signal parameter datasets.

Optionally, the SNR value is normalized by a peak SNR value computed from some of the navigation signal parameter datasets acquired over a time period.

Optionally, the peak SNR value is computed for one of the satellite signal receivers.

Optionally, the peak SNR value is computed for one of two or more navigational signal transmitters.

Optionally, the interference analysis is augmented by comparing a value of some of the navigation signal parameter datasets with values from one or more electromagnetic signals received by a cellular receiver, a television receiver, a Bluetooth receiver, and/or a wireless network receiver.

Optionally, the interference analysis is augmented by comparing a value of some of the navigation signal parameter datasets with values from a position sensor, a gyroscopic sensor, and/or an accelerometer.

According to some embodiments of the present invention there is provided a computer program product for detecting locations of navigation interfering devices. The computer program product comprises a computer readable storage medium having encoded thereon first program instructions executable by a processor to cause the processor to receive two or more navigation signal parameter datasets each from one of multiple satellite signal receivers. The computer readable storage medium has encoded thereon second program instructions executable by the processor to cause the processor to detect one or more interference event data according to an interference analysis of at least some of the navigation signal parameter datasets.

The computer readable storage medium has encoded thereon third program instructions executable by the processor to cause the processor to update two or more probability values, each for one of multiple suspected navigation interference device locations by a location analysis of the one or more interference event data. The probability values are each a likelihood of the interference event data originating from respective one of the suspected navigation interference device locations. The computer readable storage medium has encoded thereon fourth program instructions executable by the processor to cause the processor to select a subset of the suspected navigation interference device locations according to the probability values and output the subset.

According to some embodiments of the present invention there is provided a computerized device for detecting locations of navigation interfering devices. The computerized device comprises a satellite signal receiver network interface. The computerized device comprises a processor adapted to receive two or more navigation signal parameter datasets each from a satellite signal receiver using the satellite signal receiver network interface. The processor is adapted to detect one or more interference event data according to an interference analysis of at least some of the navigation signal parameter datasets. The processor is adapted to update a probability value for each of the suspected navigation interference device locations by a location analysis of the interference event data, where the probability values are each a likelihood of the interference event data originating from a respective one of the suspected navigation interference device locations. The processor is adapted to select a subset of the suspected navigation interference device locations according to the probability values and output the subset.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention may involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

The patent or application file contains at least one drawing executed in color. Copies of this patent or patent application publication with color drawings will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic illustration of a system for processing satellite signals received by a SNS receiver to locate a jammer, according to some embodiments of the invention;

FIG. 2 is a flowchart for processing satellite signals received by SNS receiver to locate a jammer, according to some embodiments of the invention;

FIG. 3 is a graph of maximum signal to noise ratio versus distance to a jammer for several SNS receivers, according to some embodiments of the invention;

FIG. 4A is a photograph illustrating a jammer location and SNS receiver recording path, according to some embodiments of the invention;

FIG. 4B is a photograph illustrating a jammer location and SNS receiver signal strengths and reported locations, according to some embodiments of the invention;

Figure 4A:
Figure 4B:
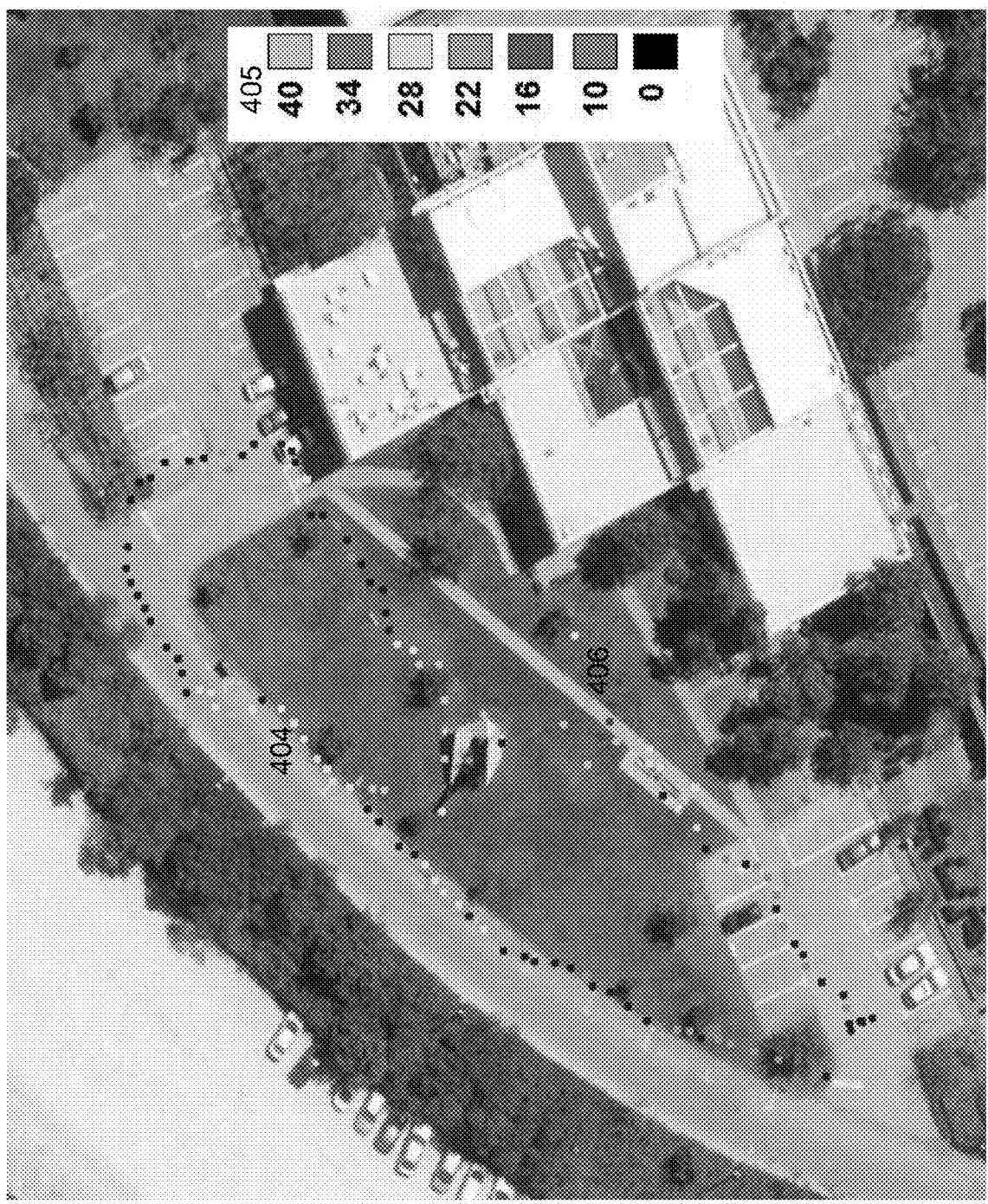
Figure 4C:
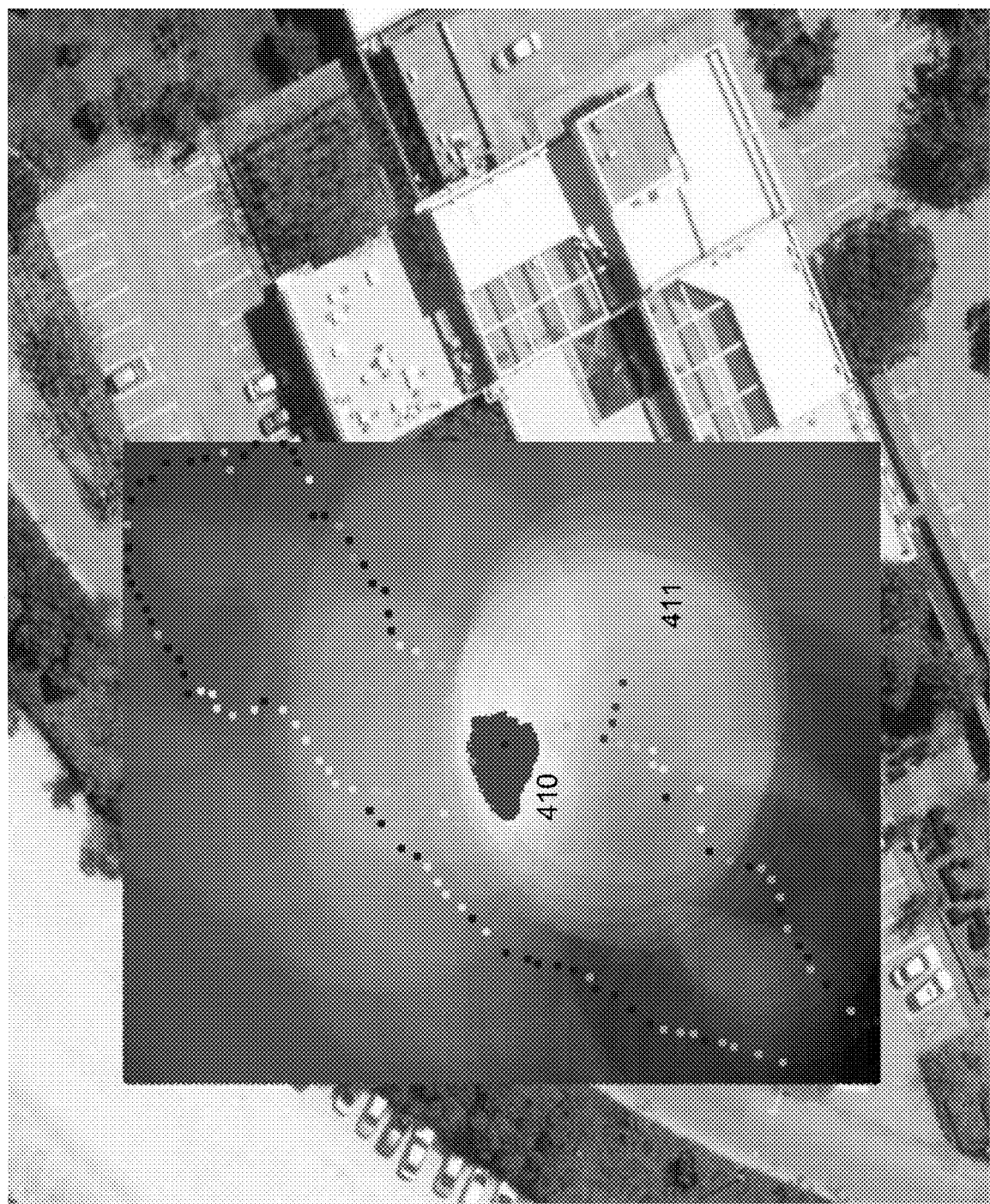
Figure 4D:
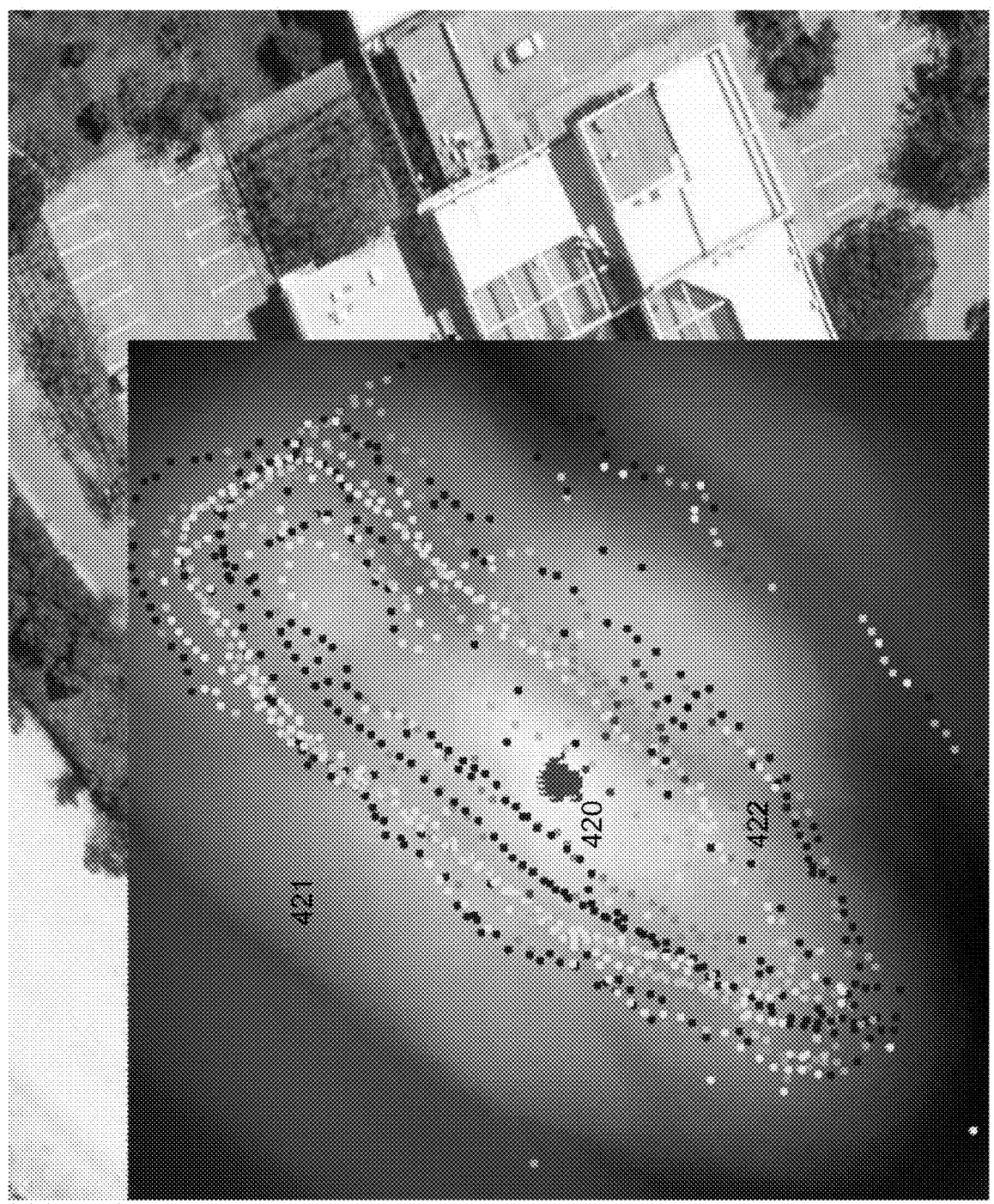

FIG. 4C is a photograph illustrating a jammer estimated location, and SNS receiver signal strengths from a single receiver at reported locations, overlaid with a jammer location probability map, according to some embodiments of the invention; and FIG. 4D is a photograph illustrating a jammer estimated location, and SNS receiver signal strengths from receivers at reported locations, overlaid with a jammer location probability map, according to some embodiments of the invention.

DETAILED DESCRIPTION

The present invention, in some embodiments thereof, relates to navigation systems and, more specifically, but not exclusively, to locating devices interfering with navigation satellite signals.

Single devices for satellite navigation system (SNS) jamming localization require expensive, dedicated SNS receiver hardware and a turnkey device, such as used by military satellite jamming detectors. Techniques for detecting SNS jammers using less expensive special SNS receivers connected to multiple mobile devices has the advantage of being more practical for civilian application, but the use of special satellite signal receivers requires a massive overhaul of existing mobile devices.

As used herein, the term navigation system means any navigation system based on emitters of electromagnetic signals containing data of the emitters, such as position, time, and the like, and receiving devices (receivers), the record these signals and use the data from the signals to determine the location of the receiving device. For example, terms Global Navigation Satellite Systems (GNSS), Global Positioning System (GPS), Satellite Navigation System (SNS) are satellite navigation systems, and these terms may be used interchangeably herein to mean navigation systems.

Embodiments of the present invention may be applied to any navigation systems that uses emitters for generating electromagnetic signals to detect and localize interference devices, such as jammers and the like, that interfere with these signals.

Using multiple SNS receivers for 3D mapping and real-time SNS positioning improvement has been described by Irish et al in "Using crowdsourced satellite SNR measurements for 3D mapping and real-time GNSS positioning improvement," in Proceedings of the 6th annual workshop on Wireless of the students, by the students, for the students published by ACM, 2014, pp. 5-8, which is incorporated by reference in its entirety. Jamming detection and localization using crowd sourcing methods was also described by Scott in "J911: The case for fast jammer detection and location using crowdsourcing approaches," published in Proceedings of the 24th International Technical Meeting of The Satellite Division of the Institute of Navigation, ION GNSS 2011, 2001, pp. 1931-1940, incorporated in by reference in its entirety. Scott describes incorporating dedicated GPS Jam to Noise (J/N) ratio detectors in mobile phones to provide timely interference detection, such as is less than 10 seconds, but the method requires new hardware not currently existing in mobile devices and a network infrastructure to collect information from the mobile devices to dedicated central computers.

According to some embodiments of the present invention, there are provided systems and methods for receiving SNS datasets from one or more SNS receivers, such as mobile device GPS receivers, and detecting a location of SNS jammers from analysis of the datasets. When one or more SNS receivers are affected by jamming interference from one or more SNS jamming devices, SNS raw datasets are sent from SNS receivers to a central processor for analysis. Suspected SNS jammers' locations and transmitting patterns are detected using a probability analysis of the suspected jammer locations from the SNS datasets. A probability map of SNS jammer locations may be used to cover all possible SNS jammer scenarios. As the SNS datasets are received, the suspected jammer location probability values and/or probability map is update until the SNS jammers are detected.

Optionally, a single SNS receiver receives multiple raw datasets from the SNS receivers. Using a single SNS receiver to localize a SNS jammer may use assumptions regarding the jammer's behavior, such as antenna pattern, transmitting power, and the like. For example, when two or more SNS jammers are interfering with the SNS satellite signals, extracting the jammer locations from a single SNS receiver's datasets is challenging.

Optionally, two or more SNS receivers send SNS raw datasets to a central computer to locate one or more suspected SNS jammers. For example, analysis of datasets from multiple SNS receivers enables SNS jamming detection and localization in complicated scenarios, such as moving SNS jammers, two or more SNS jammers, complex jamming patterns, and the like. For example, analysis of SNS signal datasets from two or more SNS receivers interfered with simultaneously is used to compute the SNS jammer's transmission power.

Optionally, the SNS raw data is used to extrapolate a SNS jamming coverage map from a jamming interference probability map, allowing a continuous prediction of each SNS receiver's error in a geographic region.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
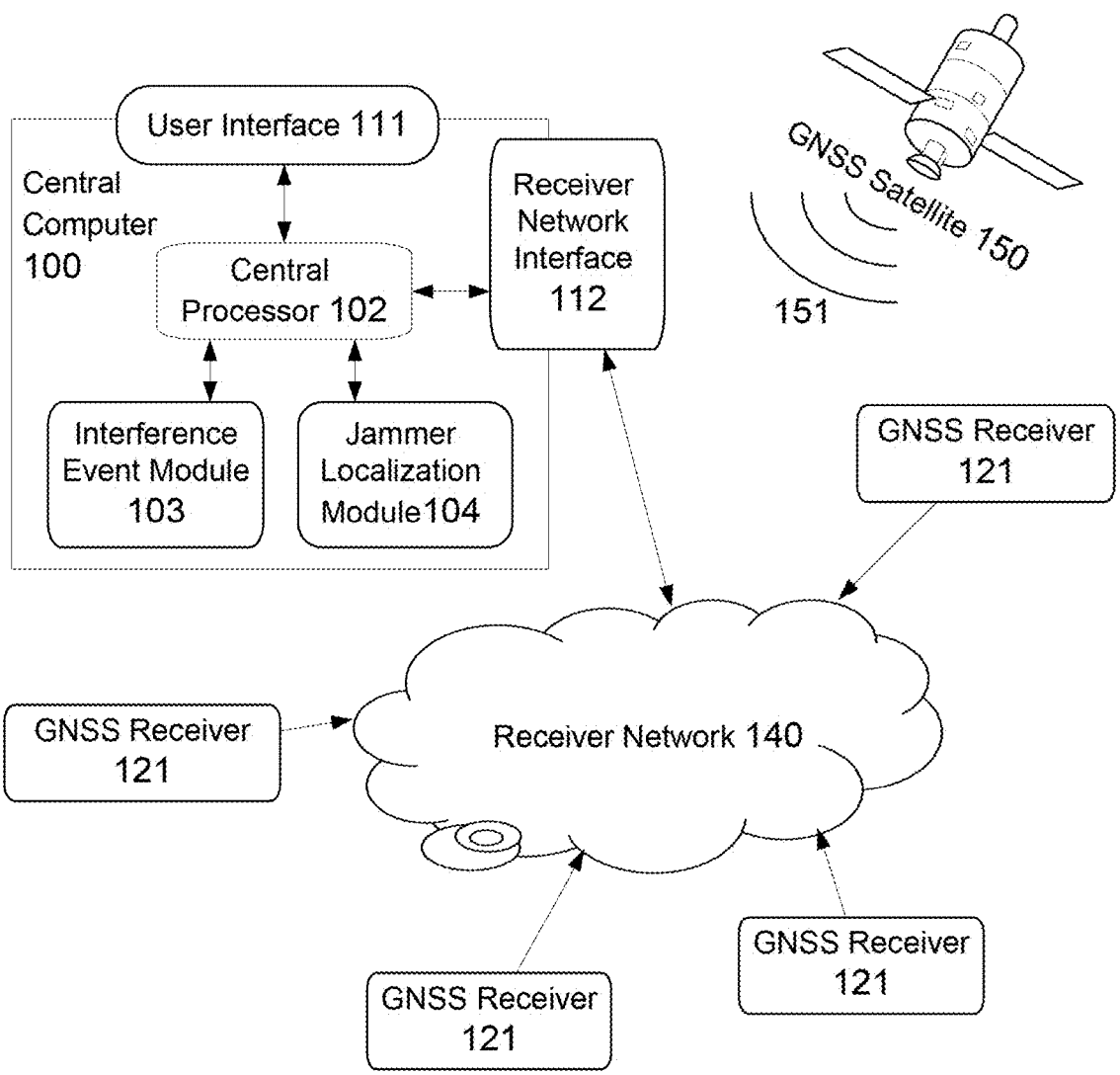
Figure 2:
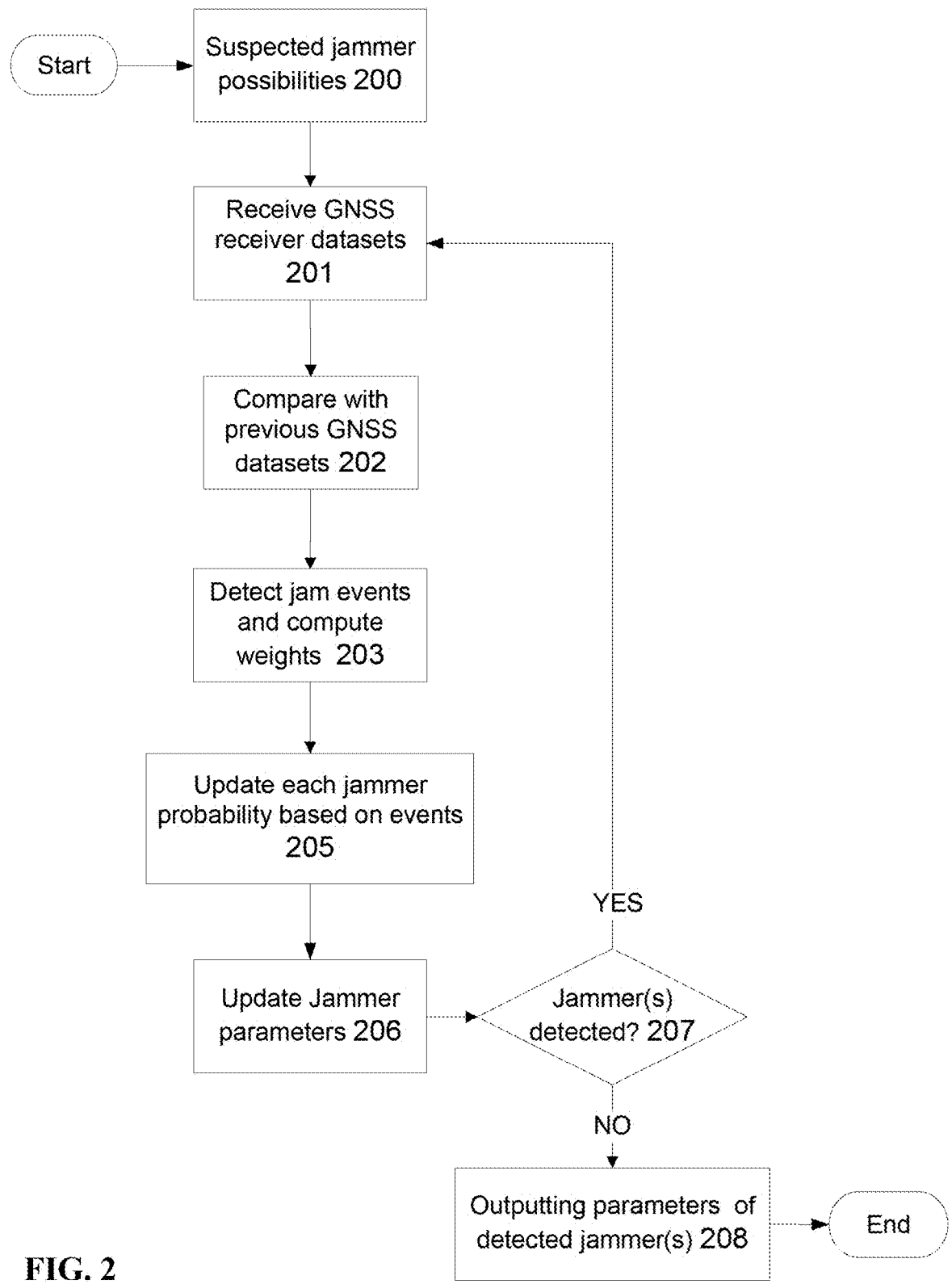

Reference is now made to FIG. 1 and FIG. 2, which are a schematic illustration of a system and a flowchart, respectively, for processing satellite signals received by a SNS receiver to locate a jammer, according to some embodiments of the invention. This example embodiment uses a GNSS as an example navigation system, but the example applies to all navigation systems using electromagnetic signals, such as GPS, SNS, and the like. A central computer 100 comprises a memory storing an Interference Event Module (IEM) 103 and a Jammer Localization Module (JLM) 104, each containing processor instructions for execution on one or more processors 102. The central computer 100 comprises a receiver network interface 112 that connects the central computer 100 to a network 140 of GNSS receivers 120. For example, the network 140 is a wireless network, a cellular network, an Ethernet network, and the like.

Initially, the JLM 104 comprises processor instructions to compute a number of suspected jammer location possibilities 200 in a geographical area.

The IEM 103 comprises processor instructions to receive 201 GNSS signal parameter datasets from one or more GNSS receivers 121. Each dataset represents the signal parameters received by one GNSS receiver 121 from a GNSS signal 151 emitted by a GNSS satellite 150 at a certain time. The IEM 103 comprises processor instructions to compare 202 the GNSS datasets between receivers and at different times, to detect 203 one of more jamming event. When a jamming event is detected, data values are computed 203, by the central processor 102 according to the IEM 103 instructions, relating to the jamming event, such as event weights, event time, estimated receiver location, and the like.

Following are details, according to some embodiments, of computing jamming event parameters by the central processor 102 using processor instructions of the IEM 103. The IEM 103 comprises instructions to compute signal to noise (SNR) values for each SNS receiver and each satellite. Each SNS receiver's maximal SNR value at a certain time t is denoted $SNR_{max}[t]$. This value is per SNS receiver and/or mobile device GPS sensor, and represents the highest SNR value from all the visible SNS satellites at a certain time t. The distance between the SNS receiver and the SNS jammer at a time t is denote $Jam_{dist}[t]$.

Figure 3:
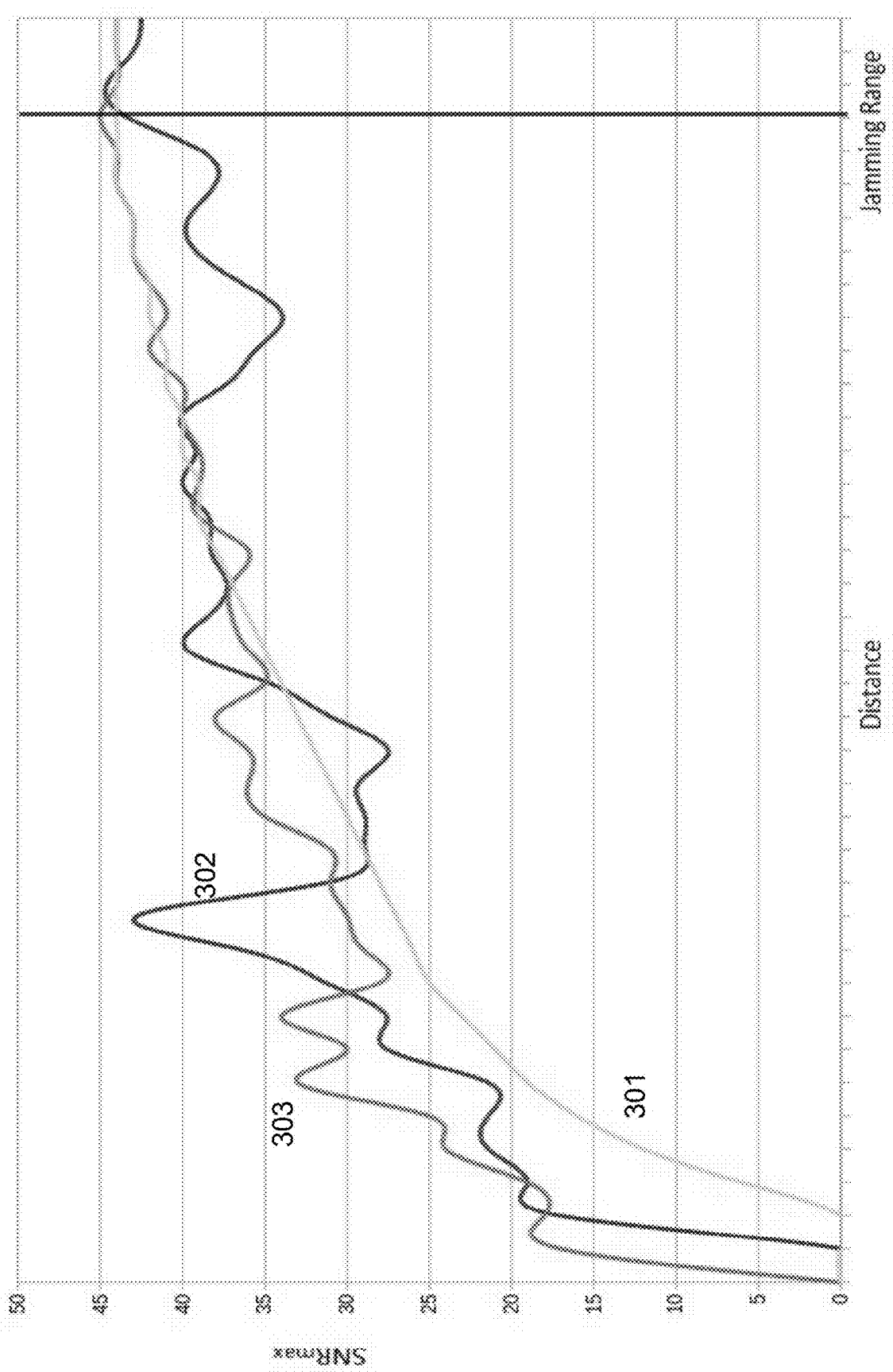

Reference is now made to FIG. 3, which is a graph of maximum signal to noise ratio versus distance to a jammer for several SNS receivers, according to some embodiments of the invention. The curves 301, 302 and 303 show the SNR values computed as a function of distance between the SNS receiver and the SNS jammer using a free space electromagnetic propagation 301, datasets from a smartphone GPS receiver 302, and datasets from a dedicated SNS receiver with an external antenna 303, respectively. The curves show a positive, nonlinear correlation exists between $SNR_{max}$ value and $Jam_{dist}$, such that the $SNR_{max}$ value decreases as the SNS receiver approaches the SNS jammer.

Optionally, each dataset and/or SNR value is calibrated by normalizing the SNR values under jamming influence to optimal $SNR_{max}$ values that are typically higher than values received under interference and/or jamming. To normalize the SNR values, for each SNS receiver an optimal SNR value, denoted $OPT_{SNR}$, is computed that is the maximal SNR value that receiver has received over a time, such as the maximum from all datasets of one or more SNS receivers. Optionally, the optimal SNR values are computed for each SNS satellite from the corresponding datasets, and used to normalize the SNR values from that satellite. For example, when each SNS satellite broadcasts SNS signals at different powers. For example, typical $OPT_{SNR}$ values range between 41 to 45 dB/Hz. Optionally, $OPT_{SNR}$ is computed for each SNS receiver separately from the other SNS receivers. For example, each SNS receiver has a different receiver sensitivity and/or gain, and $OPT_{SNR}$ is computed for each SNS receiver separately.

SNS jamming behavior may be detected by the processor(s) 102 by computing $SNR_{max}$ values for different times and locations. As each SNS receiver approaches a jammer, the $SNR_{max}$ decreases and vise versa. A jamming event, denoted $Jam_{event}[t]$, is an event in time and/or location where jamming interference is suspected, such as by computing a probability value, a likelihood value, and the like. Each $Jam_{event}[t]$ may comprise event parameter values computed by processor instructions of the IEM 103, such as the SNS receiver's location, denoted P, a weight value that indicates the strength of the jamming event, and the like. Optionally, to eliminate duplicate events, such as in the case of stationary receivers, events are filtered by the processor(s) 102 using $SNR_{max}[t]<SNR_{max}[t-1]$, such as when the receiver moves towards a jammer. Optionally, the processor(s) 102 filters jamming events to cases where the receiver moves away from the jammer, denoted $Jam'_{event}[t]$, such as when $SNR_{max}[t]>SNR_{max}[t-1]$. Optionally, both types of SNS receiver motion are filtered.

Weighted event values, denoted $Jam_{weight}[t]$, may allow embodiments to approximate the distance to each SNS jammer, denoted $Jam_{dist}$, associated with the event. The weight may be evaluated as $Jam_{weight}[t]=(OPT_{SNR}-SNR_{max}[t])/OPT_{SNR}$. For example, when the event weight increases, $Jam_{dist}$ decreases.

Given a known or estimated value for jammer transmission power, denoted $JAM_{TX}$, the $Jam_{dist}[t]$ may be computed for each event and a probability associated with the suspected SNS jammer locations on an annular jammer location probability region surrounding the SNS receiver location, such as an annular region of probabilities according to value of $Jam_{dist}[t]$. The value of $Jam_{dist}$ may be a function of $Jam_{weight}$. For example, the bigger the value of $Jam_{weight}$, the smaller the value of $Jam_{dist}$. We denote Err as the annular region's thickness where typical Err values are between 2 to 5 meters, such as the thickness of an annular region of probabilities around the SNS receiver location.

Optionally, the SNR values for each satellite are computed according to the orientation between the receiver and each satellite to determine a preferential direction for a suspected jammer location probability. For example, the annular region of probabilities lies on a distorted annular region.

Optionally, each $Jam_{event}$ determines a set of $Jam_{dist}$ values defining probabilities at different distances from the reported receiver location.

Optionally, the SNS receiver time is compared to the satellite time embedded in each dataset to compute a jamming event.

Optionally, when the SNS jammer's transmitting power, denoted $JAM_{TX}$, is known and/or guessed, the location of one or more SNS jammers is detected. Using an electromagnetic free space propagation model and given a known constant jamming transmission power, $Jam_{dist}$ may be calculated. For example, the scale of the x-axis in FIG. 3 scales with $JAM_{TX}$.

In embodiments of the present invention, a free space electromagnetic propagation model may be used to compute $Jam_{dist}$, but other models may be used, such as empirical models, statistical models, and the like.

Scaling $Jam_{dist}$ according to the jamming events, such as by estimating $JAM_{TX}$, may be performed by the processor(s) 102 by inspecting a receiver's two or more $Jam_{event}$ parameters. For example, $Jam_{dist}$ is computed using the geographic distance between jamming events and the difference in $SNR_{max}$ values. Utilizing regression techniques, an upper bound of $JAM_{TX}$ may be computed by the processor(s) 102 from one or more receiver's $Jam_{event}$ parameters. Even a coarse estimation of the $JAM_{TX}$ may be sufficient for approximating the jammer's position and region.

When datasets from SNS receivers are analyzed, a minimal bounding circle around the SNS jammer location, denoted P, may be computed from jamming event weights. The datasets may be from the same time, from similar times, and/or from different times. The bounding circle's radius may be used to compute a $JAM_{TX}$ estimation since $JAM_{TX}$ is correlated with $Jam_{dist}$.

Following are details, according to some embodiments, of computing suspected jammer location probabilities and parameters by the processor(s) 102 according to processor instructions of the JLM 104.

The JLM 104 comprises processor instructions to update 205 each suspected jammer location with a probability value based on each jammer event, and optionally update 206 other suspected jammer parameters, such as velocity, jamming pattern, jamming broadcasting orientation, and the like. For example, the velocities of the jammers are computed based on time series analysis of the jamming events parameter values. According to the instructions of the JLM 104, jammers are detected 207 when the probabilities match a rule and/or pattern, such as when one or more suspected jammer location probabilities are above a probability threshold, matching suspected jammer location probabilities to a distribution of probabilities, and/or the like. For example, the probabilities of suspected jammers are plotted on a probability map, and a peak analysis of the probability map is performed to detect the jammers. In this example, when the peak is sufficiently narrow a SNS jammer is detected.

For each $Jam_{event}$ an annular region of jammer location probabilities may be embedded on a probability map, such as a two dimensional array of probability values, at a distant of $Jam_{dist}$ around the SNS receiver's reported location. By combining annular regions from multiple SNS jamming events, such as multiplication of the probability values at each location, the probability map may show the location of a SNS jammer.

For multiple jamming events the one or more SNS jammers locations are detected from the multiplying the annular regions of probability values of each jamming event. For example, the peak of a cluster of probability values computed from the annular region probability value s multiplications in the probability map. When the geographical region is large, the distance between multiple jammers is large, and there are sufficient jamming events, multiple jammers may be detected as the points that intersect the majority of the annular regions. This example embodiment may require long convergence times, such as waiting for a sufficient number of jamming events to achieve a required probability and/or a required level of confidence. An assumption of a known $JAM_{TX}$ value may not be correct and the convergence may require some time. For example, when the SNS jammer is varying transmission power levels to avoid detection, the $JAM_{TX}$ value computed from a datasets received by a single SNS receiver may not be correct.

Optionally, when multiple SNS jammers produce interference, the JLM 104 comprises processor instructions to use probabilistic methods for analysis of signal datasets. For example, received datasets are analyzed by the processor(s) 102 using a Monte Carlo method, a Bayesian method, a particle filter method, a maximum likelihood method, a k-top survival method, and/or the like.

According to some embodiments of the present invention, a particle filter method may be used by the processor(s) 102 to update suspected jammer location probabilities. As used herein, the term particle means a suspected jammer location and associated parameters. Similar to histogram filters, particle filters estimate the posterior distribution of a finite number of parameters based on resampled measurements. Following is a mathematical analogy representing a particle filter method defined by the processor instruction in the JJM 104.

In the mathematical analogy, the samples of the posterior distribution are termed particles and represented as $\chi t := x_t^{[1]}, x_t^{[2]}, \ldots, x_t^{[M]}$ where M is the number of particles. Each particle, such as a suspected jammer location, is represented by a belief function, denoted $bel(x_t)$. For example, the greater the value of $bel(x)$ at a certain location, the greater the probability for a jammer to be located there. This belief function serves as the weight and/or importance of each particle. Thus, the equation $\{(w_t^{(L)}, x_t^{(L)}) : L \in \{1, \ldots, M\}\}$ represents a weight $w_t$ for each particle $x_t$. The weight and/or importance value is proportional to the likelihood of a specific particle being an SNS jammer: $x_t^{[L]} \sim p(x_t | z_{1:t}, u_{1:t}) \times w_t^{(L)}$ where $z_{1:t}$ and $u_{1:t}$ are sense and action functions, respectively.

For example, action functions are estimates of each jammer's velocity vector, such as a magnitude and heading. The Bayesian theorem implies that the estimation in $t_1$ is derived from the estimation in $Ft_0$. There may be more than a single plausible solution when using probabilistic methods. For example, multiple SNS jammers, each represented as a particle in the above mathematical analogy, are detected simultaneously. As used herein, the term particle means a particular SNS jammer with an associated suspected jammer location probability and parameters.

The particle parameters, such as SNS jammer parameters, are repeatedly updated by the processor(s) 102 with each jamming event according to their respective weight and/or probability. For example, particles with high weights and/or probabilities are more likely to survive each iteration.

A particle $x(t)^{[L]}$ is a candidate location for a jammer device at time t. Each particle comprises parameters such as a position, velocity, orientation and transmitting power, such as $JAM_{TX}(L,t)$, and the like. For example, stationary jammers have a velocity equal to zero.

A particle filter method may address the complicated jamming scenario of moving jammers and dynamic transmitting power. Moving SNS jammers affect the different SNS receivers in the region in different ways. For example, when a jammer moves from location A to location B, SNS receivers next to be B may report $Jam_{event}$ with decreasing SNR while receivers next to A report the opposite.

Changes in the transmitting power of the SNS jammer may affect all the receivers the same way, such as when a jammer is turned off $SNR_{max}$ may increase or stay the same for all the SNS receivers concurrently. Suspected locations of SNS jammers are spread over the geographical region, and each jammer comprises a location, velocity, and/or the like. Then, the action function, $u_t$ is executed. Each action function may move a particle, such as according to its velocity, and/or change its transmitting power, thus, changing its interference region's radius.

The sense function, $z_t$, produces a weight and/or likelihood for each particle based on the receiver's GNSS data. The resampling stage favors the more likely particles, such as particles with a higher probability value. Assuming a 10 Hz dataset sampling rate and N number of particles that is greater than the number of SNS jammers, the method executed by the processor(s) 102 converges to detect clusters of particles. For example, two or more clusters imply two or more SNS jammers active simultaneously within the geographical region.

When the SNS jammers are detected with sufficient probability by the processor(s) 102, the JLM 104 comprises instructions to output 208 parameters of the detected jammer(s), such as to a user interface 111.

Following are results of computing jamming events and suspected jammer location probabilities, according to some embodiments of the present invention.

Reference is now made to FIG. 4A, which is a photograph illustrating a jammer location and SNS receiver recording path, according to some embodiments of the invention. A portable GPS jammer with 40 meters jamming range was placed on a tree, represented as a black star 401. Several GPS receivers 121 we moved along the yellow path 402 while recording GNSS datasets. The GNSS datasets were received by a central computer 100 and analyzed by the processor(s) 102.

Reference is now made to FIG. 4B, which is a photograph illustrating a jammer location and SNS receiver signal strengths and reported locations, according to some embodiments of the invention. The colored dots 404 represent the GNSS dataset values along the recorded path 402. Each color represents values of $SNR_{max}[t]$ 405. Green dots represent $SNR_{max}[t] \geq 40$, blue dots represent $34 \leq SNR_{max}[t] < 40$, and the like. The colored dots 404 show that $SNR_{max}[t]$ degrades 406 as the receiver approaches the jammer 401 and vice versa. Along the path the SNS receiver did not record loosing fix events, but some satellites became invisible, a phenomena that affects the GPS location accuracy. The difference between the original yellow path 402 and the recorded GNSS path 404 represent the location error due to the SNS jammer interference.

Reference is now made to FIG. 4C, which is a photograph illustrating a jammer estimated location, and SNS receiver signal strengths from a single receiver at reported locations, overlaid with a jammer location probability map, according to some embodiments of the invention. Each jamming probability annular region 411 assigns suspected jammer location probabilities on to the probability map. Multiplying the probability annular regions from each jamming event allows detection of a peak probability at a suspected jammer's location represented by the red region 410. The error in suspected jammer's location is about 5 meters.

Reference is now made to FIG. 4D, which is a photograph illustrating a jammer estimated location, and SNS receiver signal strengths from receivers at reported locations, overlaid with a jammer location probability map, according to some embodiments of the invention. Three SNS receivers recorded $SNR_{max}$ values along the path 402 of FIG. 4A, where the colored dots 422 represent ranges of $SNR_{max}$ values as in FIG. 4B. Combining the annular regions of probability values for suspected jammer locations produces a probability map 421, where the brighter gray levels are the greater probability and/or likelihood for a jammer at that location in the region. The brightest region 420, marked in red, is the highest probability of the jammer's location, and may be used as an estimate for the SNS jammer's location. The error in jammer location is less than 2 meters.

The improvement in error of estimating the SNS jammer's location using three SNS receivers instead of one is illustrated as the larger size of the red region 410 in FIG. 4C compared to the red region 420 of FIG. 4D. This may be due to the noise of each receiver, which is compensated for when datasets form multiple receivers are analyzed. Further, the SNS receiver estimated location error in the FIG. 4C is larger, as seen by both blue and green dots inside the red region 410 on FIG. 4C.

Optionally, an embedded microcontroller may be the central processor. For example, a 32-bit microcontroller unit, such as an ARM Cortex M4 processor, is the central processor. For example, one of the SNS receivers comprises a central processor. For example, the SNS receiver with a processor is smaller than a pack of cigarettes, a book of matches, and the like. For example, the central processor is a processor of a smartphone, tablet, mobile device, and the like. For example, the SNS receiver records datasets at a 10 Hz sampling rate, and the central process detects SNS jammers at a 1 Hz sampling rate.

The methods as described above may be used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant navigation systems will be developed and the scope of the term satellite navigation system (SNS) is intended to include all such new technologies a priori.

It is expected that during the life of a patent maturing from this application many relevant global positioning systems will be developed and the scope of the term global positioning systems is intended to include all such new technologies a priori.

It is expected that during the life of a patent maturing from this application many relevant SNS jammers will be developed and the scope of the term SNS jammers is intended to include all such new technologies a priori.

It is expected that during the life of a patent maturing from this application many relevant SNS receivers will be developed and the scope of the term SNS receivers is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for detecting locations of navigation interfering devices comprising:
   detecting at least one interference event data according to an interference analysis of a plurality of navigation signal parameter datasets received from a plurality of satellite signal receivers;
   calculating a plurality of suspected navigation interference device locations by a location analysis of said at least one interference event data; and
   plotting at least some of the plurality of suspected navigation interference device locations on a map of a geographical region; and
   outputting said map.

2. The method of claim 1, wherein said calculating further comprises updating a plurality of probability values each for one of said plurality of suspected navigation interference device locations, wherein each one of said plurality of probability values is indicative of a likelihood that said at least one interference event data originates from some of said plurality of suspected navigation interference device locations.

3. The method of claim 2, wherein said plotting is performed according to the plurality of probability values.

4. The method of claim 2, wherein said location analysis comprises a particle filter method iteratively applied to said plurality of suspected navigation interference device locations, wherein each of said plurality of suspected navigation interference device locations is considered one of a plurality of particles and wherein in each iteration some of said plurality of probability values are updated.

5. The method of claim 1, wherein each of said plurality of navigation signal parameter datasets is received by one of said plurality of satellite signal receivers from one of a plurality of navigation signal transmitters.

6. The method of claim 5, wherein each of said plurality of navigation signal transmitters are incorporated in one of a plurality of navigational satellites.

7. The method of claim 5, wherein each of said plurality of navigational signal transmitters belongs to one of a global navigation satellite system, a global positioning system, a regional navigation satellite system, and a local navigation system.

8. The method of claim 1, wherein said plurality of navigation signal parameter datasets are received by respective said plurality of satellite signal receivers at different times.

9. The method of claim 1, wherein said plurality of navigation signal parameter datasets are received by respective said plurality of satellite signal receivers at different locations.

10. The method of claim 1, wherein each of said at least one interference event data corresponds to one of said plurality of satellite signal receivers.

11. The method of claim 1, wherein said at least one interference event data comprises an event tag, an event weight, an event location, and an event time.

12. The method of claim 1, wherein said plurality of suspected navigation interference device locations comprise location coordinates, a device transmission power value, a device velocity value, and a device transmission orientation value.

13. The method of claim 1, wherein said interference analysis is performed by calculating a plurality of signal to noise ratio (SNR) values from some of said plurality of navigation signal parameter datasets associated with one of said plurality of satellite signal receivers.

14. The method of claim 13, wherein said location analysis is performed by calculating a plurality of suspected distances from some of respective said plurality of satellite signal receivers, wherein each of said plurality of suspected distances defines an annular region of probability values around respective one of said plurality of satellite signal receivers.

15. The method of claim 14, wherein said map is a probability map and said annular regions are combined to generate a probability map of a geographical region.

16. The method of claim 15, wherein said at least some of the plurality of suspected navigation interference device locations are selected by calculating at least one peak of said probability map.

17. The method of claim 1, wherein said interference analysis compares a value of respective some of said navigation signal parameter datasets with a respective known value.

18. The method of claim 1, wherein said interference analysis is augmented by comparing a value of some of said navigation signal parameter datasets with values from at least one electromagnetic signal received by at least one of a cellular receiver, a television receiver, a Bluetooth receiver, and a wireless network receiver.

19. A computer program product for detecting locations of navigation interfering devices, said computer program product comprising:
a computer readable storage medium having encoded thereon:
first program instructions executable by a processor to cause said processor to detect at least one interference event data according to an interference analysis of a plurality of navigation signal parameter datasets received from a plurality of satellite signal receivers;
second program instructions executable by said processor to cause said processor to calculate a plurality of suspected navigation interference device locations by a location analysis of said at least one interference event data; and
third program instructions executable by said processor to cause said processor to plot at least some of the plurality of suspected navigation interference device locations on a map of a geographical region; and
fourth program instructions executable by said processor to cause said processor to output said map.

20. A computerized device for detecting locations of navigation interfering devices, comprising:
a satellite signal receiver network interface; and
a processor adapted to:
detect at least one interference event data according to an interference analysis of a plurality of navigation signal parameter datasets received from a plurality of satellite signal receivers;
calculating a plurality of suspected navigation interference device locations by a location analysis of said at least one interference event data; and
plot at least some of the plurality of suspected navigation interference device locations on a map of a geographical region; and
output said map.

* * * * *